United States Patent Office 3,293,044
Patented Dec. 20, 1966

3,293,044
METHOD OF MAKING AN EGG PRODUCT
David Torr, Oyster Bay, N.Y., assignor to Ralston Purina Company, St. Louis, Mo.
No Drawing. Filed Dec. 23, 1963, Ser. No. 332,912
8 Claims. (Cl. 99—113)

This invention relates generally to food products and is specifically directed to the treatment of eggs and thus the conversion thereof into novel and improved form thereby rendering them substantially more marketable and more versatile of application both to the industrial user and to the ultimate consumer.

Nothwithstanding the high nutritional advantages derived through the utilization of eggs in the human diet, the employement of eggs to that end has seriously diminished in recent years, such decline being largely attributable to the ever present problems of egg breakage and spoilage during the lengthy handling route from producer to final consumer. In addition to those difficulties relating to the generally known fragile and perishable character of eggs, the transportation and storage drawbacks associated with the bulky space-wasting configuration of the egg, further tend to discourage greater and more widespread consumption thereof.

Whereas the foregoing many shortcomings identify with the declining trend in the use of eggs for human consumption, the instant invention has for its primary purpose the obviation of those shortcomings and hence the reversal of said trend.

A more specific object of the present invention resides in the provision of a method of occasioning the physical combination of the white and yolk of the egg to form a non-perishable product substantially analogous to butter or mayonnaise with respect to consistency and texture.

Another object of the instant invention is to provide an egg product in accordance with the foregoing possessed of the conventionally accepted yellow appearance normally associated with beaten whole fresh eggs.

A further object of the invention is to provide a whole egg product requiring no refrigeration and which may be utilized as a spread for sandwiches, requiring only seasoning.

Another object of the present invention resides in the provision of a whole egg product which when further admixed with water, milk, cream and seasoning, will enable the preparation of scrambled eggs, omelettes and French toast, exhibiting excellence both with respect to appearance and taste.

A still further object of the invention is to provide a packaged and preserved whole egg product which may be directly employed as an ingredient for the baking of bread, cake, pastries and the like.

Another object of the invention resides in the preparation of an egg product of the foregoing character which may be utilized in the manufacture of ice cream, mayonnaise and salad dressings.

Another object of the instant invention is to provide an egg product which may be used in the manufacture of pancake, waffle and doughnut mixes and in the production of noodles, macaroni and the like.

Another object of the invention resides in the provision of an egg product useful as a component in batters for fried and baked poultry, fish, meats and other foods requiring such batters.

Still another object of the present invention is to provide a whole egg product useful in the preparation of confectionary, whipped toppings, frozen desserts, icings and the like.

Another general object of the present invention resides in the treatment of eggs whereby the product formed may be utilized in the preparation of infant foods and in the geriatric art as well.

The whole egg product prepared according to the present invention may also be marketed as a convenient whole egg spread admixed with cheese, bacon, ham, etc., singly or in combination and further admixed with seasonings such as salt, pepper, onion, garlic and various herbs, mushrooms and the like.

It will be understood that the foregoing objectives are exemplary and explanatory but are not restrictive of the invention, there being other features and advantages, some of which, together with the foregoing, will be specifically set forth in the detailed description of the method and product of the invention hereunto annexed.

In carrying out the process of the present invention, the whole egg, preferably that of the hen, and comprised of yolk and albumen, is first separated from the shell and thereafter mixed until the completely homogeneous blending of the yolk and white of the egg is accomplished. Where commercially frozen whole egg is used, the blending will preferably be effectuated subsequent to the defrosting thereof.

The thus far obtained homogeneously blended whole egg is essentially comprised of 70.6% yolk and 29.4% albumen, these organic constituents being primarily composed of various proteins, lipids, and carbohydrates, the protein value present being approximately equally contributed by yolk and albumen alike.

Anti-coagulants and preservatives are added to the blended whole egg product in quantities such that each will, respectively, comprise approximately 1–5% of the total product by weight. Vegetable oils such as safflower, peanut, cotton seed, corn and soya oils as well as other suitable coagulation preventive agents such as commercial bakers' yeast, enzymes, etc., may be utilized. Preservatives such as sodium benzoate, sodium bicarbonate and/or sodium chloride may be utilized either singly or in combination in the proportion heretofore stated.

The homogeneous whole egg product together with the foregoing additives is then placed in a high speed colloid mill such as the Morehouse Mill or the Morehouse-Cowles Dispersator. In reducing the whole egg product to colloid dispersion condition, a considerable amount of heat may be generated in the colloid mill and cooling may be necessary to avoid overheating and coagulation of the egg product during this step of the process.

In the event the color of the egg product obtained thus far is at variance with the normally accepted yellow appearance of a mixed yolk and albumen product, natural carotene, i.e., carrot extract, may be added to the newly formed colloidal product to impart the normally accepted coloration thereto.

The colloid thus formed is next passed through a standard homogenizer such as the Manton-Gaulin milk homogenizer, the temperature of the product during homogenization being maintained at approximately 30–40° F.

The homogenized whole egg product obtained as a result of the foregoing treatment is poured directly into jars, cans or other suitable containers and pasteurized therein or sterilized therein and thereafter either stored under refrigeration or not, depending upon whether pasteurization or sterilization has been accomplished.

As an alternative, the whole egg product in homogenized form may be placed in a standard mixer, preferably under vacuum, wherein the product is further admixed with food mixes such as bacon, ham, cheese, fruit, seasonings, spices, herbs, mushrooms, etc., and mixtures of the foregoing. The admixed homogenized whole egg product and food mix combination is thereafter poured directly into jars, cans or other suitable containers and either pasteurized or sterilized while therein as required.

The finished product within the container may now be marketed in any conventionally known manner, i.e., under refrigeration between 30 and 40° F. where pasteurization thereof at 165° F. had been performed; or unrefrigerated, where sterilization at 240° F. for the required time had been accomplished.

It will be appreciated that the presence of the coagulation preventive agents, added as heretofore described, will preclude any coagulation prior to the pasteurization or sterilization step, such step being carried out after the product is in the container within which it will be ultimately marketed. Pasteurization or sterilization will, however, engender partial coagulation of the product thus transforming the finally packaged whole egg product into a form cognate to that of butter or mayonnaise with respect to appearance, texture and consistency. Accordingly, the pasteurized or sterilized whole egg product may be marketed and used industrially or in the home either in the form combined with food mixes or therewithout. The product so formed will fulfill any purposes and functions that eggs marketed naturally within the shell can fulfill, with the obvious exception, however, of enabling the preparation of the "bull's-eye" in either the fried or the poached form. The inestimable value of the instant invention, however, resides in the elimination of breakage, spoilage, unavoidable occupation of wasted storage space and transportation problems otherwise occasioned in the utilization of the egg in its natural form as heretofore practiced. Thus, the new whole egg product greatly supersedes in versatility and convenience the utilization of the egg in the natural form.

Inasmuch as changes may be made in carrying out the above method and product, without departing from the scope of the invention, it is intended that all matter contained in the above description shall be interpreted as illustrative and exemplary and not in a limiting sense. Accordingly, such variations falling within the purview of this invention may be made while within the spirit of the invention and without sacrificing any of the attendant advantages thereof, provided, however, that such changes fall within the scope of the claims appended thereto.

What is claimed is:

1. The method of treating the yolks and albumen of whole eggs to form an egg product of butter-like consistency and texture, comprising the steps of integrating only the yolks and albumen to form a blended mixture thereof, of adding anti-coagulent and preservative agents to said blended mixture, of reducing said blended mixture with a colloid mill to colloid form, of further breaking down the particles of the colloid product by passing the product through a homogenizer while maintaining the temperature of the product within the temperature range of approximately 30-40° F., of pouring the homogenized product into containers, and of pasteurizing the homogenized product while in the containers.

2. The method of treating the yolks and albumen of whole eggs to form an egg product of butter-like consistency and texture, comprising the steps of blending the yolks and albumen to form a homogeneous mixture thereof, of adding anti-coagulent and preservative agents to said homogeneous mixture, of reducing said homogeneous mixture in a colloid milk to colloid form, of further breaking down the particles of the colloid product by passing the product through a homogenizer while maintaining the temperature of the product within the range of approximately 30-40° F., of pouring the homogenized product into containers, and sterilizing the homogenized product while in the container.

3. The method of treating the yolks and albumen of whole eggs to form an egg product of mayonnaise-like consistency and texture, comprising the steps of blending the yolks and albumen to form a homogeneous mixture thereof, of adding anti-coagulent and preservative agents to said homogeneous mixture, of reducing said homogeneous mixture in a colloid mill to a colloidal dispersion, adding coloring matter to the colloidal dispersion, of further breaking down the particles of the colloidal dispersion by homogenizing said particles in an homogenizer, and of raising the temperature of the egg product to occasion partial coagulation thereof.

4. The method as set forth in claim 3 wherein the coloring matter is carotene.

5. The method of treating the yolks and albumen of whole eggs to form an egg product, comprising the steps of integrating the yolks and albumen to form a blended mixture thereof, adding anti-coagulent and preservative agents to said blended mixture, reducing said blended mixture in a colloid mill to a colloidal dispersion, homogenizing said colloidal dispersion in a homogenizer while maintaining the product within a temperature range of approximately 30-40° F., adding food mixes to the product, and raising the temperature of the product to occasion partial coagulation thereof.

6. The method as set forth in claim 5 wherein the food mixes added to the producet are selected from the group consisting of bacon, ham, cheese, fruit, seasonings, spices, herbs, mushrooms and mixtures of the foregoing.

7. The method as set forth in claim 5 wherein the temperature of the product, after homogenization, is raised to approximately 165° F.

8. The method as set forth in claim 5 wherein the temperature of the product, after homogenization, is raised to approximately 240° F.

References Cited by the Examiner

UNITED STATES PATENTS

| | | | |
|---|---|---|---|
| 2,669,518 | 2/1954 | Torr | 99—113 |
| 2,766,126 | 10/1956 | Hawk | 99—113 XR |
| 2,848,334 | 8/1958 | Jones | 99—113 |
| 2,936,240 | 5/1960 | Kauffman | 99—196 |
| 3,093,487 | 6/1963 | Jones et al. | 99—161 |
| 3,166,424 | 1/1965 | Stewart et al. | 99—161 XR |

A. LOUIS MONACELL, *Primary Examiner.*

L. M. SHAPIRO, *Assistant Examiner.*